United States Patent [19]

Jablonski

[11] Patent Number: 4,881,080

[45] Date of Patent: Nov. 14, 1989

[54] APPARATUS FOR AND A METHOD OF DETERMINING COMPASS HEADINGS

[75] Inventor: Daniel G. Jablonski, Silver Spring, Md.

[73] Assignee: The United States of America as represented by the Secretary of the Navy, Washington, D.C.

[21] Appl. No.: 748,248

[22] Filed: Jun. 24, 1985

[51] Int. Cl.[4] .......................... G01S 5/02; H04B 7/185
[52] U.S. Cl. ...................................... 342/357; 342/451
[58] Field of Search ...................... 343/357, 352, 451; 342/356, 385, 386, 417, 443, 450, 352, 357

[56] References Cited

U.S. PATENT DOCUMENTS

| | | | |
|---|---|---|---|
| 3,171,126 | 2/1965 | Wiley | 343/357 X |
| 3,191,176 | 6/1965 | Guier | 343/357 |
| 3,643,259 | 2/1972 | Entner | 343/357 |
| 4,589,100 | 5/1986 | Savit | 343/357 X |

*Primary Examiner*—Thomas H. Tarcza
*Assistant Examiner*—John B. Sotomayor
*Attorney, Agent, or Firm*—Kenneth E. Walden; John G. Wynn

[57] ABSTRACT

A compass system and method incorporating a global positioning system (GPS), such as the NAVSTAR/GPS multi-satellite system, is configured to acquire accurate compass heading information without being affected by magnetic anomalies and without being dependent on the elapsed time since a previous position fix. The compass system comprises, inter alia, two antenna/preamplifiers located, for example, fore and aft a ship or aircraft separated by a predetermined distance d. A microprocessor/minicomputer portion of the system causes an electronic coaxial switch to switch a GPS receiver between the two antenna/preamplifiers automatically thereby measuring their absolute positions. The microprocessor/minicomputer computes and displays on a display unit a compass heading based on the knowledge of the absolute positions of the antenna/preamplifiers and the distance d therebetween.

9 Claims, 1 Drawing Sheet

APPARATUS FOR AND A METHOD OF DETERMINING COMPASS HEADINGS

BACKGROUND OF THE INVENTION

1. Field of the Invention

The present invention relates to compass systems and methods, but more particularly, it relates to a nonmagnetic and noninertial compass system and method incorporating a global positioning system (GPS), such as the NAVSTAR/GPS multisatellite system.

2. Description of the Prior Art

Current navigation systems which yield compass heading u information relay on magnetic compasses, gyrocompasses, and other inertial navigation systems. Magnetic compasses are unreliable in the Northern latitudes and require knowledge of position in order to compensate for magnetic variation. Gyrocompasses lose accuracy as the square of the time elapsed since their initial zeroing. This initial calibration also requires a knowledge of a heading for the platform. Consequently, there is a need in the prior art to acquire accurate compass heading information without being affected by magnetic anomalies, and without being dependent on the elapsed time after an initial zeroing or calibration of the compass and/or knowledge of the initial heading of the platform.

In the near future, it is believed that most commercial and military ships and aircraft will make use of the NAVSTAR/GPS multi-satellite system in order to determine position anywhere in the world. The contemplated 18 to 24 satellites will generate precisely timed radio signals which will enable ground, sea, or airborne GPS receivers to determine their absolute self-position within 10 meters (for instantaneous measurements) or to within tenths of a meter when special algorithms and time integration techniques are used. At the present time, the NAVSTAR/GPS multi-satellite system is operational with six satellites in earth orbit. With position data from four satellites, an advanced receiver, such as the Texas instrument 4100 or the Litton Industries LTN-700, can compute position in three dimensions, as well as velocity With position data from three satellites, a three-dimensional position fix can be obtained, i.e., longitude, latitude and altitude. However, if altitude and time are known, position data from only two satellites are required to obtain a two-dimensional position fix, i.e., longitude and latitude.

There are several established operational modes for the NAVSTAR/GPS multi-satellite system. Of particular interest, as related to the present invention, is the standard navigation mode, where one antenna and one GPS receiver are used for either shipboard or airborne navigation, and the differential positioning mode, where two antennas and their corresponding two GPS receivers are linked to provide a measurement of the difference in position between the GPS receivers. The differential positioning mode has application for surveying and positioning where one of the GPS receivers is placed at an established benchmark. The other GPS receiver might, for example, be placed aboard an oil rig that is being moved particular location. The advantage of this differential mode is its extreme accuracy. This is because navigation errors problems with transmission of the satellite signals through the atmosphere, e.g., the ephemeris errors, are cancelled. Thus, computation of the relative position of two GPS receivers can be significantly more accurate than an absolute position measurement using one GPS receiver. Consequently, there is a need in the prior art to take advantage of the extreme accuracy of the differential mode in the configuration of nonmagnetic and noninertial compass systems and methods (a compass mode), while eliminating the requirement for two GPS receivers.

The prior art, as indicated hereinabove, includes advances in compass systems and methods incorporating the NAVSTAR/GPS multi-satellite system. However, insofar as can be determined, no prior art compass system or method incorporates all of the features and advantages of the present invention.

OBJECTS OF THE INVENTION

Accordingly, an important object of the present invention is to configure a compass and devise a method to acquire accurately compass heading information without being affected by magnetic anomalies, and without a dependence on the elapsed time after an initial zeroing of gyroscopic equipment, and without a dependence on knowledge of past position, heading, or navigation information.

Another important object of the present invention is to take advantage of the extreme accuracy of the differential mode of a NAVSTAR/GPS multi-satellite system in the configuration of nonmagnetic and noninertial compass systems and methods (a compass mode of operation), while eliminating the requirement of establishing the absolute position of one antenna/GPS receiver to extreme accuracy.

A further important object of the present invention is to take advantage of the extreme accuracy of the differential mode while eliminating the requirement for two GPS receivers.

Still a further important object of the present invention is to configure a nonmagnetic and noninertial compass that will be a low-cost add-on to existing GPS receivers on ships and aircraft.

SUMMARY OF THE INVENTION

In accordance with the above stated objects, other objects, features and advantages, the primary purpose of the present invention is to configure an add-on, nonmagnetic and noninertial (i.e., no gyroscopes) compass for ship and aircraft navigation use.

The essence of the present invention is in relating the relative position of one antenna/preamplifier to another antenna/preamplifier disposed on a platform (ship or aircraft), separated by a predetermined distance d, to the heading of the platform.

The purpose of the present invention is carried out by configuring the nonmagnetic and noninertial compass to further comprise an electronic coaxial switch, a GPS receiver, an interface unit, a microprocessor/minicomputer, a buffer, a keyboard and a display unit. The microprocessor/minicomputer, which interconnects the other units, causes the coaxial switch to switch the GPS/receiver automatically between each antenna/preamplifier, thus measuring the absolute positions thereof. The microprocessor/minicomputer computes and displays a compass heading on the display unit based on the knowledge of the coordinates (X1, Y1, Z1) and (X2, Y2, Z2) of the two antenna/preamplifiers and the distance d therebetween.

BRIEF DESCRIPTION OF THE DRAWINGS

The foregoing, other objects, novel features and advantages of the present invention will be more apparent from the following more particular description of a preferred embodiment as illustrated in the accompanying drawings, in which.

DESCRIPTION OF THE PREFERRED EMBODIMENT

Figure 1:
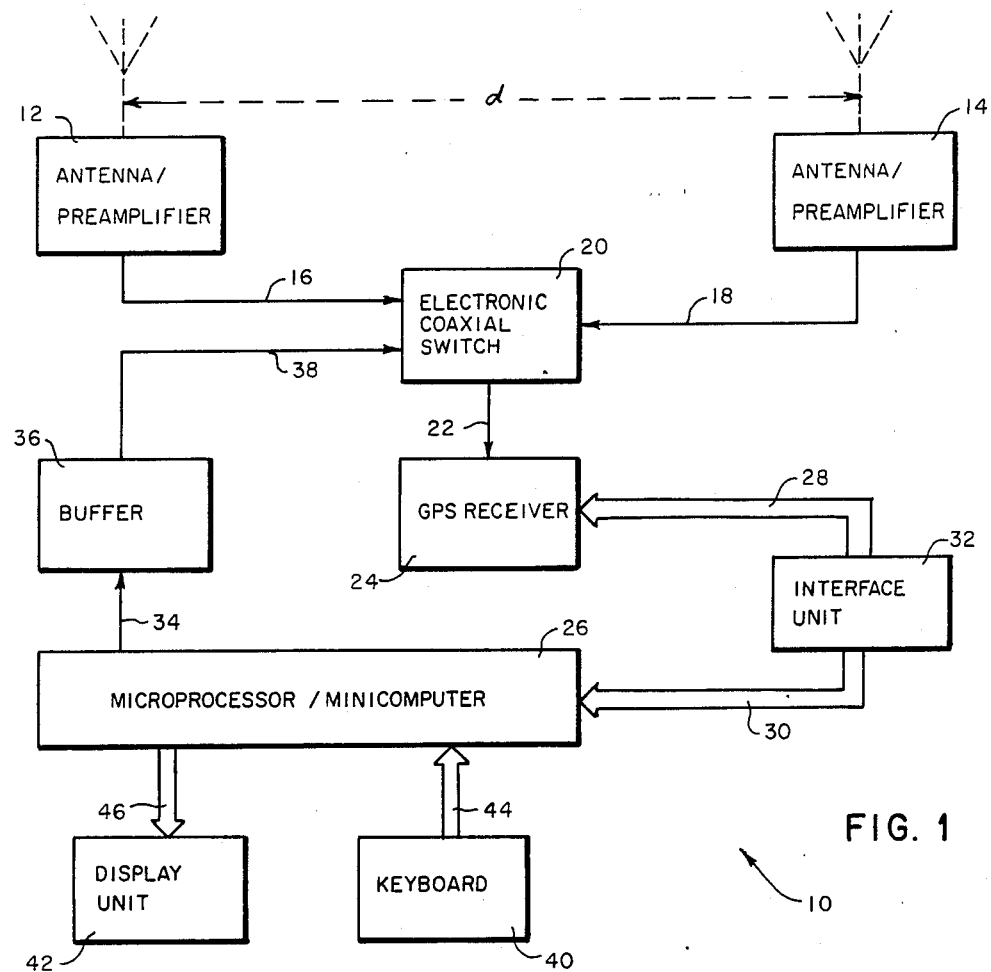
FIG. 1 is a block diagram representation of a nonmagnetic and noninertial compass embodying the present invention and method, which includes, inter alia a first antenna/preamplifier and a second antenna/preamplifier separated by a predetermined distance d.

FIG. 1 is a block diagram of a non-magnetic and noninertial compass 10 in which the present invention is employed to generate compass headings. It includes two identical antenna/preamplifiers 12 and 14 separated by a predetermined distance d on a platform (ship or aircraft) (not shown). The antenna/preamplifiers 12 and 14 are connected via coaxial cables 16 and 18 to an electronic coaxial switch 20. For purposes of the present invention each of the coaxial cables 16 and 18 will will be of sufficient length to allow positioning of the antenna/preamplifiers 12 and 14 at opposite ends, i.e., fore and aft of the platform.

To continue, the electronic coaxial switch 20 is connected via a coaxial cable 22 to a GPS receiver 24 such as the ones previously mentioned. The GPS receiver 24 is connected to a microprocessor/minicomputer 26 via buses 28 and 30 connected to an interface unit 32. A control line 34 couples the microprocessor/minicomputer 26 to a buffer 36. The buffer 36 conditions a control signal from the microprocessor/minicomputer 26 to the proper level to electronically control the switching action of the electronic coaxial switch 20 via a control line 38. A keyboard 40 for initiating the compass mode of operation, and a display unit 42 for displaying the actual compass headings are also connected via buses 44 and 46, respectively, to the microprocessor/minicomputer 26.

STATEMENT OF THE OPERATION

Figure 2:
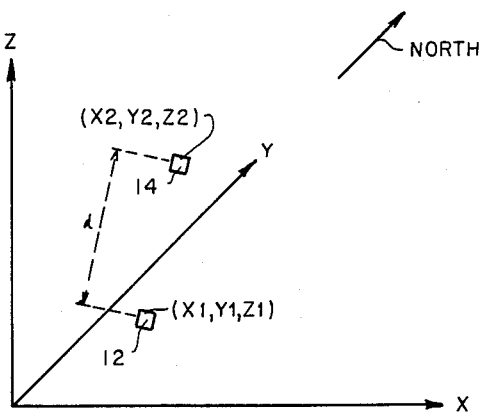
FIG. 2 is a coordinate system used in explaining the operation of the nonmagnetic and noninertial compass of FIG. 1 and to show the coordinate location of the first antenna/preamplifier and the second antenna/preamplifier of FIG. 1.

Details of the operation and the method, according to the present invention, are explained in conjunction with FIGS. 1 and 2 viewed concurrently.

Upon a command which is input from the keyboard 40, the microprocessor/minicomputer 26 reads and stores for future use the position fix, for example, of antenna/preamplifier 12 from the GPS receiver 24. Once this position data is received, the microprocessor/minicomputer 26 switches, via, inter alia, the electronic coaxial switch 20, the GPS receiver 24 to antenna/preamplifier 14. The GPS receiver 24 feeds position data via the interface unit 32 via to the microprocessor/minicomputer 26 when a position fix for the antenna/preamplifier 14 (for our example) is computed. Internal timing circuitry (not shown) within the microprocessor/minicomputer 26 waits for a predetermined time of, for example, about 5 seconds. If the position fix for the antenna/preamplifier 14 is not determined by then, the microprocessor/minicomputer 26 interrupts operation of the GPS receiver 24 and provides an estimated position fix for the location of the antenna/preamplifier 14. This estimate is based on the previously recorded position for the antenna/preamplifier 12. A correction may or may not be added to account for the known baseline, i.e., the predetermined distance d between the antenna/preamplifiers 12 and 14. This will depend on the availability of a previous estimate, contained in the microprocessor/minicomputer 26, for the compass heading. If this previous estimate of the heading is available, the estimated position fix for antenna/preamplifier 14 will be given by the previous position fix for antenna/preamplifier 12 plus correction terms for the latitude, Y1, and longitude, X1, of antenna/preamplifier 12. These correction terms will be equal to d times the cosine and d times the sine of the compass heading, respectively. At any rate, provision of the estimated position fix for the antenna/preamplifier 14, if necessary, will guarantee that the GPS receiver 24 computes an accurate position fix for antenna/preamplifier 14 in a very few seconds. Without this estimate, the time required to generate a position fix for antenna/preamplifier 14 may be greatly increased.

Once the position fix for the antenna/preamplifier 14 is derived by the GPS receiver 24, the position fix information is conveyed via the interface unit 32 to the microprocessor/minicomputer 26, where it is stored. Thus, the microprocessor/minicomputer 26 causes the electronic coaxial switch 20 to switch the GPS receiver 24 between the two antenna/preamplifiers 12 and 14, thereby measuring their absolute position (X1, Y1, Z1) and (X2, Y2, Z2), respectively, where $$(X2-X1)^2 + (Y2-Y1)^2 + (Z2-Z1)^2 = d^2.$$

The foregoing relationship is shown in the coordinate system of FIG. 2. Using standard trigonometric algorithms, the microprocessor/minicomputer 26 computes and displays on the display unit 42 a compass heading based on the knowledge of the coordinates of the antenna/preamplifiers 12 and 14, and the predetermined distance d separating them. For example, a ship at sea will have Z1=Z2 (i.e., the ship is horizontal). If the Y direction is defined as NORTH, and the ship is pointed North East (i.e., the heading is=45°), then $$\arctan[(X2-X1)/(Y2-Y1)] = 45°,$$

where $(X2-X1)^2 + (Y2-Y1)hu 2 = d^2$, and X1, X2, Y1, Y2 are determined automatically by the GPS receiver 24. The operation of the system progresses, with the microprocessor/minicomputer 26 switching the GPS receiver 24 between the two antenna/preamplifiers 12 and 14 and continuously providing an updated compass heading as display on display unit 42.

If the predetermined distance d is approximately 100 meters (the length of a large ship), then a relative uncertainty of 1 meter in position will yield an uncertainty of compass heading of the order of 0.6 degree. Consequently, total accuracy of the system depends on the position measurements of the two antenna/preamplifiers 12 and 14 relative to each other, and not on the accuracy of the absolute position measurement of either one of the antenna/preamplifier 12 and 14. The relative accuracy will be greater than the absolute accuracy.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. An improved method of determining compass headings of a platform (ship or aircraft) in association with the NAVSTAR/GPS multi-satellite system, said improved method comprising the steps of:
   positioning first and second antenna/preamplifiers fore and aft on paid platform a predetermined distance d apart in line with the heading of said platform;
   receiving position derivable data from said NAVSTAR/GPS multisatellite system via said first and second antenna/preamplifiers;
   reading the position fix of said first antenna/preamplifier from a GPS receiver into a microprocessor/minicomputer;
   switching said GPS receiver to said second antenna/preamplifier;
   reading the position fix of said second antenna/preamplifier from said GPS receiver into said microprocessor/minicomputer; and
   computing an equivalent compass heading in said microprocessor/minicomputer according to a predetermined equation based on the position fixes of said first and second antenna/preamplifiers as determined by said GPS receiver and the predetermined distance d therebetween.

2. The improved method of claim 1 comprising the addition steps of:
   interrupting said GPS receiver after a predetermined waiting period starting after the reading of the position fix of said first antenna/preamplifier but ending before the reading of the position fix of said second antenna/preamplifier by said microprocessor/minicomputer; and
   estimating by said microprocessor/minicomputer a position fix for said second antenna/preamplifier based on the previously read position fix of first antenna/preamplifier.

3. The improved method of claim 2 wherein a correction, taking into account the predetermined distance d between said first and second antennas, is made to the estimated position fix of second antenna/preamplifier if a previous estimate for the compass heading of the platform is available in said microprocessor/minicomputer.

4. The improved method of claim 3 wherein the predetermined equation used in the computing step is:

$$(X2-X1)^2 + (Y2-Y1)^2 + (Z2-Z1)^2 = d^2,$$

where X1, Y1, Z1 and X2, Y2, Z2 are the position fixes of said first and second antenna/preamplifiers respectively, as determined by said GPS receiver, and d is the predetermined distance between said first and second antenna/preamplifiers.

5. The improved method of claim 4 comprising the additional step of switching said GPS receiver to said first antenna/preamplifier, and repeating reading the position fix of said first antenna/preamplifier, switching said GPS receiver to said second antenna/preamplifier, reading the position fix of said second antenna/preamplifier, and computing an equivalent compass heading, thereby providing a continuously updated compass heading.

6. Apparatus determining compass headings of a platform (ship or aircraft) in association with the NAVSTAR/GPS multi-satellite system comprising:
   means for positioning first and second antenna/preamplifiers fore and aft on said platform a predetermined distance d apart in line with the heading of said platform;
   means for receiving position determinable data from said NAVSTAR/GPS multi-satellite system via said first and second antenna/preamplifiers;
   means for reading the position fix of said first antenna/preamplifier from a GPS receiver into a microprocessor/minicomputer;
   means for switching said GPS receiver to said second antenna/preamplifier;
   means for reading the position fix of said second antenna/preamplifier from said GPS receiver into said microprocessor/minicomputer; and
   means for computing an equivalent compass heading in said microprocessor/minicomputer according to a predetermined equation based on the position fixes of said first and second antenna/preamplifiers as determined by said GPS receiver and the predetermined distance d therebetween.

7. The apparatus of claim 6 further comprising:
   means for interrupting said GPS receiver after a predetermined waiting period starting after the reading of the position fix of said first antenna/preamplifier but ending before the reading of the position fix of said second antenna/preamplifier by said microprocessor/minicomputer; and
   means for estimating by said microprocessor/minicomputer a position fix for said second antenna/preamplifier based on the previously read position fix of first antenna/preamplifier.

8. The apparatus of claim 7 wherein the predetermined equation used in the computing step is:

$$(X2-X1)^2 + (Y2-Y1)^2 + (Z2-Z1)^2 = d^2,$$

where X1, Y1, Z1 and X2, Y2, Z2 are the position fixes of said first and second antenna/preamplifiers respectively, as determined by said GPS receiver, and is the predetermined distance between said first and second antenna/preamplifiers.

9. The apparatus of claim 8 further comprising means for switching said GPS receiver to said first antenna/preamplifier, repeatedly reading the position fix of said first antenna/preamplifier, switching said GPS receiver to said second antenna/preamplifier, reading the position fix of said second antenna/preamplifier and computing an equivalent compass heading, thereby providing a continuously updated compass heading.

* * * * *